(12) United States Patent
Pfeifer et al.

(10) Patent No.: US 12,420,350 B2
(45) Date of Patent: Sep. 23, 2025

(54) HELMET-INTEGRATED WELD TRAVEL SPEED SENSING SYSTEM AND METHOD

(71) Applicant: Illinois Tool Works Inc., Glenview, IL (US)

(72) Inventors: Kyle Andrew Pfeifer, Appleton, WI (US); William Todd Watson, Mount Prospect, IL (US); Richard Martin Hutchison, Iola, WI (US); William Joshua Becker, Manitowoc, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/110,064

(22) Filed: Feb. 15, 2023

(65) Prior Publication Data

US 2023/0191522 A1   Jun. 22, 2023

Related U.S. Application Data

(63) Continuation of application No. 16/828,178, filed on Mar. 24, 2020, now Pat. No. 11,590,596, which is a
(Continued)

(51) Int. Cl.
*B23K 9/095* (2006.01)
*G01P 3/36* (2006.01)
(Continued)

(52) U.S. Cl.
CPC ............ *B23K 9/0956* (2013.01); *B23K 9/095* (2013.01); *B23K 9/0953* (2013.01); *G01P 3/36* (2013.01);
(Continued)

(58) Field of Classification Search
CPC .... B23K 9/095; B23K 9/0953; B23K 9/0956; G01S 11/14; G01S 11/12
See application file for complete search history.

(56) References Cited

U.S. PATENT DOCUMENTS

| 1,340,270 A | 5/1920 | Emil |
| 2,045,800 A | 6/1936 | Walther |

(Continued)

FOREIGN PATENT DOCUMENTS

| CA | 2311685 | 12/2001 |
| CA | 2517874 | 12/2001 |

(Continued)

OTHER PUBLICATIONS

"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.

(Continued)

*Primary Examiner* — Thien S Tran
(74) *Attorney, Agent, or Firm* — McAndrews, Held & Malloy, Ltd.

(57) ABSTRACT

A welding system includes a first sensor associated with a welding helmet and configured to sense a parameter indicative of a position of a welding torch relative to the welding helmet. The travel speed sensing system also includes a processing system communicatively coupled to the first sensor and configured to determine a position of the welding torch relative to a workpiece based on the sensed first parameter.

20 Claims, 5 Drawing Sheets

Related U.S. Application Data continuation of application No. 15/369,474, filed on Dec. 5, 2016, now Pat. No. 10,596,650, which is a continuation of application No. 13/755,984, filed on Jan. 31, 2013, now Pat. No. 9,511,443.

(60) Provisional application No. 61/597,556, filed on Feb. 10, 2012.

(51) Int. Cl.
  *G01P 3/38* (2006.01)
  *G01S 11/12* (2006.01)
  *G01S 11/14* (2006.01)
  *G01S 17/58* (2006.01)

(52) U.S. Cl.
  CPC ............... *G01P 3/38* (2013.01); *G01S 11/12* (2013.01); *G01S 11/14* (2013.01); *G01S 17/58* (2013.01)

(56) References Cited

U.S. PATENT DOCUMENTS

| | | |
|---|---|---|
| 2,045,801 A | 6/1936 | Richter |
| 2,045,802 A | 6/1936 | Walther |
| 2,333,192 A | 11/1943 | Moberg |
| 2,351,910 A | 6/1944 | Blankenbuehler |
| 3,702,915 A | 11/1972 | Vilkas |
| 3,867,769 A | 2/1975 | Schow |
| 4,028,522 A | 6/1977 | Chihoski |
| 4,041,615 A | 8/1977 | Whitehill |
| 4,044,377 A | 8/1977 | Bowerman |
| 4,124,944 A | 11/1978 | Blair |
| 4,132,014 A | 1/1979 | Schow |
| 4,144,766 A | 3/1979 | Wehrmeister |
| 4,224,501 A | 9/1980 | Lindbom |
| 4,396,945 A | 8/1983 | Dimatteo |
| 4,399,346 A | 8/1983 | Kearney |
| 4,452,589 A | 6/1984 | Denison |
| 4,459,114 A | 7/1984 | Barwick |
| 4,518,361 A | 5/1985 | Conway |
| 4,532,405 A | 7/1985 | Corby, Jr. |
| 4,541,055 A | 9/1985 | Wolfe |
| 4,555,614 A | 11/1985 | Morris |
| 4,577,499 A | 3/1986 | Silke |
| 4,581,518 A | 4/1986 | Takahashi |
| 4,591,689 A | 5/1986 | Brown |
| 4,594,497 A | 6/1986 | Takahashi |
| 4,595,368 A | 6/1986 | Cole |
| 4,595,820 A | 6/1986 | Richardson |
| 4,609,806 A | 9/1986 | Grabkowski |
| 4,628,176 A | 12/1986 | Kojima |
| 4,638,146 A | 1/1987 | Koyama |
| 4,680,014 A | 7/1987 | Paton |
| 4,689,021 A | 8/1987 | Vasiliev |
| 4,711,986 A | 12/1987 | Lillquist |
| 4,716,273 A | 12/1987 | Paton |
| 4,721,947 A | 1/1988 | Brown |
| 4,728,768 A | 3/1988 | Cueman |
| 4,739,404 A | 4/1988 | Richardson |
| 4,867,685 A | 9/1989 | Brush |
| 4,868,649 A | 9/1989 | Gaudin |
| 4,881,678 A | 11/1989 | Gaudin |
| 4,931,018 A | 6/1990 | Herbst et al. |
| 4,937,427 A | 6/1990 | Mcvicker |
| 4,943,702 A | 7/1990 | Richardson |
| 4,954,690 A | 9/1990 | Kensrue |
| 4,996,409 A | 2/1991 | Paton |
| 5,045,669 A | 9/1991 | Ortiz, Jr. |
| 5,061,841 A | 10/1991 | Richardson |
| 5,185,561 A | 2/1993 | Good |
| 5,211,564 A | 5/1993 | Martinez |
| 5,275,327 A | 1/1994 | Watkins |
| 5,283,418 A | 2/1994 | Bellows |
| 5,304,774 A | 4/1994 | Durheim |
| 5,306,893 A | 4/1994 | Morris |
| 5,320,538 A | 6/1994 | Baum |
| 5,334,816 A | 8/1994 | Sugiyama |
| 5,343,011 A | 8/1994 | Fujii |
| 5,380,978 A | 1/1995 | Pryor |
| 5,397,872 A | 3/1995 | Baker |
| 5,426,732 A | 6/1995 | Boies |
| 5,464,957 A | 11/1995 | Kidwell |
| 5,514,846 A | 5/1996 | Cecil |
| 5,517,420 A | 5/1996 | Kinsman |
| 5,521,843 A | 5/1996 | Hashima |
| 5,571,431 A | 11/1996 | Lantieri |
| 5,617,335 A | 4/1997 | Hashima |
| 5,659,479 A | 8/1997 | Duley |
| 5,674,415 A | 10/1997 | Leong |
| 5,675,229 A | 10/1997 | Thorne |
| 5,681,490 A | 10/1997 | Chang |
| 5,698,120 A | 12/1997 | Kurosawa |
| 5,708,253 A | 1/1998 | Bloch |
| 5,709,219 A | 1/1998 | Chen |
| 5,747,042 A | 5/1998 | Choquet |
| 5,823,785 A | 10/1998 | Matherne, Jr. |
| 5,832,139 A | 11/1998 | Batterman |
| 5,856,844 A | 1/1999 | Batterman |
| 5,930,093 A | 7/1999 | Morrissett |
| 5,999,909 A | 12/1999 | Rakshit |
| 6,018,729 A | 1/2000 | Zacharia |
| 6,039,494 A | 3/2000 | Pearce |
| 6,049,059 A | 4/2000 | Kim |
| 6,051,805 A | 4/2000 | Vaidya |
| 6,155,475 A | 12/2000 | Ekelof |
| 6,163,946 A | 12/2000 | Pryor |
| 6,226,395 B1 | 5/2001 | Gilliland |
| 6,236,017 B1 | 5/2001 | Smartt et al. |
| 6,242,711 B1 | 6/2001 | Cooper |
| 6,271,500 B1 | 8/2001 | Hirayama |
| 6,290,740 B1 | 9/2001 | Schaefer |
| 6,301,763 B1 | 10/2001 | Pryor |
| 6,315,186 B1 | 11/2001 | Friedl |
| 6,329,635 B1 | 12/2001 | Leong |
| 6,337,458 B1 | 1/2002 | Lepeltier |
| 6,371,765 B1 | 4/2002 | Wall |
| 6,441,342 B1 | 8/2002 | Hsu |
| 6,445,964 B1 | 9/2002 | White |
| 6,476,354 B1 | 11/2002 | Jank |
| 6,479,793 B1 | 11/2002 | Wittmann |
| 6,506,997 B2 | 1/2003 | Matsuyama |
| 6,516,300 B1 | 2/2003 | Rakshit |
| 6,572,379 B1 | 6/2003 | Sears |
| 6,583,386 B1 | 6/2003 | Ivkovich |
| 6,596,972 B1 | 7/2003 | Di Novo |
| 6,614,002 B2 | 9/2003 | Weber |
| 6,621,049 B2 | 9/2003 | Suzuki |
| 6,647,288 B2 | 11/2003 | Madill |
| 6,697,761 B2 | 2/2004 | Akatsuka |
| 6,703,585 B2 | 3/2004 | Suzuki |
| 6,710,298 B2 | 3/2004 | Eriksson |
| 6,728,582 B1 | 4/2004 | Wallack |
| 6,734,393 B1 | 5/2004 | Friedl |
| 6,744,011 B1 | 6/2004 | Hu |
| 6,750,428 B2 | 6/2004 | Okamoto |
| 6,768,974 B1 | 7/2004 | Nanjundan |
| 6,839,049 B1 | 1/2005 | Koizumi |
| 6,857,553 B1 | 2/2005 | Hartman |
| 6,868,726 B2 | 3/2005 | Lemkin |
| 6,910,971 B2 | 6/2005 | Alsenz |
| 6,927,360 B2 | 8/2005 | Artelsmair |
| 6,937,329 B2 | 8/2005 | Esmiller |
| 6,977,357 B2 | 12/2005 | Hsu |
| 6,995,536 B2 | 2/2006 | Challoner |
| 7,015,419 B2 | 3/2006 | Hackl |
| 7,045,742 B2 | 5/2006 | Feichtinger |
| 7,132,617 B2 | 11/2006 | Lee |
| 7,132,623 B2 | 11/2006 | Demiranda |
| 7,150,047 B2 | 12/2006 | Fergason |
| 7,181,413 B2 | 2/2007 | Hadden |
| 7,342,210 B2 | 3/2008 | Fergason |
| 7,358,458 B2 | 4/2008 | Daniel |
| 7,465,230 B2 | 12/2008 | Lemay |

(56) References Cited

U.S. PATENT DOCUMENTS

| | | | |
|---|---|---|---|
| 7,474,760 B2 | 1/2009 | Hertzman |
| 7,523,069 B1 | 4/2009 | Friedl et al. |
| 7,564,005 B2 | 7/2009 | Cabanaw |
| 7,574,172 B2 | 8/2009 | Clark et al. |
| D614,217 S | 4/2010 | Peters |
| 7,698,094 B2 | 4/2010 | Aratani |
| D615,573 S | 5/2010 | Peters |
| 7,789,811 B2 | 9/2010 | Cooper |
| 7,826,984 B2 | 11/2010 | Sjostrand |
| 7,831,098 B2 | 11/2010 | Melikian |
| 7,839,416 B2 | 11/2010 | Ebensberger |
| 7,845,560 B2 | 12/2010 | Emanuel |
| D631,074 S | 1/2011 | Peters |
| 7,899,618 B2 | 3/2011 | Ledet |
| 7,962,967 B2 | 6/2011 | Becker |
| 8,019,144 B2 | 9/2011 | Sugihara |
| 8,100,694 B2 | 1/2012 | Portoghese |
| 8,248,324 B2 | 8/2012 | Nangle |
| 8,274,013 B2 | 9/2012 | Wallace |
| 8,316,462 B2 | 11/2012 | Becker et al. |
| 8,406,682 B2 | 3/2013 | Elesseily |
| 8,431,862 B2 | 4/2013 | Kachline |
| 8,432,476 B2 | 4/2013 | Ashforth |
| 8,512,043 B2 | 8/2013 | Choquet |
| 8,657,605 B2 | 2/2014 | Wallace |
| 8,681,178 B1 | 3/2014 | Tseng |
| 8,692,157 B2 | 4/2014 | Daniel |
| 8,698,843 B2 | 4/2014 | Tseng |
| 8,747,116 B2 | 6/2014 | Zboray et al. |
| 8,834,168 B2 | 9/2014 | Peters |
| 8,851,896 B2 | 10/2014 | Wallace |
| 8,860,760 B2 | 10/2014 | Chen |
| 8,915,740 B2 | 12/2014 | Zboray |
| 8,953,909 B2 | 2/2015 | Guckenberger |
| 8,990,842 B2 | 3/2015 | Rowley |
| 9,011,154 B2 | 4/2015 | Kindig |
| 2001/0032508 A1 | 10/2001 | Lemkin |
| 2002/0114653 A1 | 8/2002 | Gatta |
| 2002/0153354 A1 | 10/2002 | Norby |
| 2003/0011673 A1 | 1/2003 | Eriksson |
| 2003/0092496 A1 | 5/2003 | Alsenz |
| 2003/0172032 A1 | 9/2003 | Choquet |
| 2003/0208296 A1 | 11/2003 | Brisson |
| 2004/0069754 A1 | 4/2004 | Bates |
| 2004/0175684 A1 | 9/2004 | Kaasa |
| 2004/0251910 A1 | 12/2004 | Smith |
| 2005/0006363 A1 | 1/2005 | Hsu |
| 2005/0017152 A1 | 1/2005 | Fergason |
| 2005/0127052 A1 | 6/2005 | Spencer |
| 2005/0133488 A1 | 6/2005 | Blankenship |
| 2005/0135682 A1 | 6/2005 | Abrams |
| 2005/0197115 A1 | 9/2005 | Clark et al. |
| 2005/0256611 A1 | 11/2005 | Pretlove |
| 2006/0010551 A1 | 1/2006 | Bishop |
| 2006/0136183 A1 | 6/2006 | Choquet |
| 2006/0163228 A1 | 7/2006 | Daniel |
| 2006/0173619 A1 | 8/2006 | Brant |
| 2006/0241432 A1 | 10/2006 | Herline |
| 2007/0038400 A1 | 2/2007 | Lee |
| 2007/0114215 A1 | 5/2007 | Bill |
| 2007/0164006 A1 | 7/2007 | Burgstaller |
| 2007/0187378 A1 | 8/2007 | Karakas |
| 2007/0188606 A1 | 8/2007 | Atkinson |
| 2007/0248261 A1 | 10/2007 | Zhou |
| 2007/0264620 A1 | 11/2007 | Maddix |
| 2007/0278196 A1 | 12/2007 | James |
| 2008/0038702 A1* | 2/2008 | Choquet ............... A61B 5/1124 |
| | | | 434/260 |
| 2008/0061113 A9 | 3/2008 | Seki |
| 2008/0078751 A1 | 4/2008 | Abrott |
| 2008/0124698 A1 | 5/2008 | Ebensberger |
| 2008/0149608 A1 | 6/2008 | Albrecht |
| 2008/0158502 A1 | 7/2008 | Becker |
| 2008/0169277 A1 | 7/2008 | Achtner |
| 2008/0314887 A1 | 12/2008 | Stoger |
| 2009/0005728 A1 | 1/2009 | Weinert |
| 2009/0057286 A1 | 3/2009 | Ihara |
| 2009/0109128 A1 | 4/2009 | Nangle |
| 2009/0146359 A1 | 6/2009 | Canfield |
| 2009/0152251 A1 | 6/2009 | Pantinne |
| 2009/0161212 A1 | 6/2009 | Gough |
| 2009/0173726 A1 | 7/2009 | Davidson et al. |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1 | 9/2009 | Becker et al. |
| 2009/0249606 A1 | 10/2009 | Diez |
| 2009/0298024 A1 | 12/2009 | Batzler |
| 2010/0048273 A1 | 2/2010 | Wallace |
| 2010/0062405 A1 | 3/2010 | Zboray |
| 2010/0062406 A1 | 3/2010 | Zboray |
| 2010/0133247 A1 | 6/2010 | Mazumder |
| 2010/0201803 A1 | 8/2010 | Melikian |
| 2010/0207620 A1 | 8/2010 | Gies |
| 2010/0224610 A1 | 9/2010 | Wallace |
| 2010/0283588 A1 | 11/2010 | Gomez |
| 2010/0291313 A1 | 11/2010 | Ling |
| 2011/0000892 A1 | 1/2011 | Mueller |
| 2011/0006047 A1 | 1/2011 | Penrod |
| 2011/0063438 A1 | 3/2011 | Fuchs |
| 2011/0091846 A1 | 4/2011 | Kreindl |
| 2011/0092828 A1 | 4/2011 | Spohn |
| 2011/0117527 A1 | 5/2011 | Conrardy |
| 2011/0183304 A1 | 7/2011 | Wallace |
| 2011/0186615 A1 | 8/2011 | Gatlin |
| 2011/0220616 A1 | 9/2011 | Mehn |
| 2011/0220619 A1 | 9/2011 | Mehn |
| 2011/0249090 A1 | 10/2011 | Moore |
| 2011/0290765 A1 | 12/2011 | Albrecht |
| 2011/0313731 A1 | 12/2011 | Vock |
| 2012/0072021 A1 | 3/2012 | Walser |
| 2012/0077174 A1 | 3/2012 | Depaul |
| 2012/0105476 A1 | 5/2012 | Tseng |
| 2012/0122062 A1 | 5/2012 | Yang et al. |
| 2012/0180180 A1 | 7/2012 | Steve |
| 2012/0189993 A1 | 7/2012 | Kindig |
| 2012/0231894 A1 | 9/2012 | Nicora |
| 2012/0248080 A1 | 10/2012 | Hutchison |
| 2012/0248083 A1 | 10/2012 | Garvey |
| 2012/0291172 A1 | 11/2012 | Wills |
| 2012/0298640 A1 | 11/2012 | Conrardy |
| 2012/0318775 A1 | 12/2012 | Schwarz |
| 2012/0323496 A1 | 12/2012 | Burroughs |
| 2013/0040270 A1 | 2/2013 | Albrecht |
| 2013/0081293 A1 | 4/2013 | Delin |
| 2013/0189656 A1 | 7/2013 | Zboray |
| 2013/0189658 A1 | 7/2013 | Peters |
| 2013/0200882 A1 | 8/2013 | Almalki |
| 2013/0206740 A1 | 8/2013 | Pfeifer et al. |
| 2013/0206741 A1 | 8/2013 | Pfeifer et al. |
| 2013/0208569 A1 | 8/2013 | Pfeifer |
| 2013/0209976 A1 | 8/2013 | Postlethwaite |
| 2013/0264315 A1 | 10/2013 | Hung |
| 2013/0288211 A1 | 10/2013 | Patterson |
| 2014/0014638 A1 | 1/2014 | Artelsmair |
| 2014/0017642 A1 | 1/2014 | Postlethwaite |
| 2014/0131337 A1 | 5/2014 | Williams |
| 2014/0134579 A1 | 5/2014 | Becker |
| 2014/0134580 A1 | 5/2014 | Becker |
| 2014/0184496 A1 | 7/2014 | Gribetz |
| 2014/0263224 A1 | 9/2014 | Becker |
| 2014/0263227 A1 | 9/2014 | Daniel et al. |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0315167 A1 | 10/2014 | Kreindl |

FOREIGN PATENT DOCUMENTS

| | | |
|---|---|---|
| CA | 2549553 | 7/2004 |
| CA | 2554498 | 4/2006 |
| DE | 102010038902 | 2/2012 |
| EP | 0323277 | 7/1989 |

(56) References Cited

FOREIGN PATENT DOCUMENTS

| | | |
|---|---|---|
| EP | 0878263 | 11/1998 |
| EP | 0963744 | 12/1999 |
| EP | 1029306 | 8/2000 |
| EP | 1295195 | 6/2001 |
| EP | 1573699 | 9/2005 |
| EP | 1797545 | 6/2007 |
| EP | 2022592 | 2/2009 |
| EP | 2022592 A1 * 2/2009 | ........... B23K 9/0956 |
| ES | 2438440 | 1/2014 |
| FR | 1456780 | 7/1966 |
| FR | 2827066 | 1/2003 |
| GB | 2454232 A | 5/2009 |
| JP | H09220690 | 8/1997 |
| JP | H11146387 | 5/1999 |
| JP | 2000298427 | 10/2000 |
| JP | 2004181493 | 7/2004 |
| JP | 2007021542 | 2/2007 |
| JP | 2008110388 | 5/2008 |
| JP | 2009125790 | 6/2009 |
| KR | 100876425 | 12/2008 |
| SU | 972552 | 11/1982 |
| SU | 1354234 | 11/1987 |
| SU | 1489933 | 6/1989 |
| SU | 1638145 | 3/1991 |
| WO | 03019349 | 1/2003 |
| WO | 2004057554 | 7/2004 |
| WO | 2005102230 | 11/2005 |
| WO | 2005110658 | 11/2005 |
| WO | 2006034571 | 4/2006 |
| WO | 2007009131 | 1/2007 |
| WO | 2009022443 | 2/2009 |
| WO | 2009053829 | 4/2009 |
| WO | 2009060231 A1 | 5/2009 |
| WO | 2009092944 | 7/2009 |
| WO | 2009146359 A1 | 12/2009 |
| WO | 2010000003 | 1/2010 |
| WO | 2010020867 | 2/2010 |
| WO | 2010020870 | 2/2010 |
| WO | 2012137060 | 10/2012 |
| WO | 2013023012 | 2/2013 |
| WO | 2013138831 | 9/2013 |
| WO | 2014007830 | 1/2014 |

OTHER PUBLICATIONS

"NJC Technology Displayed at ShipTech 2005", Welding Journal, vol. 84, No. 3, Mar. 2005, p. 54, https://app.aws.org/w/r/www/wj/2005/03/WJ_2005_03.pdf.
"Sheet Metal Conference XXII," Conference Program, American Welding Society, May 2006, Detroit.
"Virtual Reality Program to Train Welders for Shipbuilding", American Welding Society, Navy Joining Center, https://app.aws.org/wj/2004/04/052/.
"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.
"Virtual Welding—A Low Cost Virtual Reality Welder Training System", Interim Status Report # 4, Technology Investment Agreement 2008-600, Feb. 18, 2009, http://www.nsrp.org/3-Key_Deliverables/FY08_Low-Cost_Virtual_Reality_Welder_Trainer/FY08_Low-Cost_Virtual_Reality_Welder_Trainer-Interim2.pdf.
"Virtual Welding: A Low Cost Virtual Reality Welder Training System," NSRP ASE, Feb. 19, 2009, http://www.nsrp.org/6-presentations/WD/020409_Virtual_Welding_Wilbur.pdf.
"Vision for Welding Industry," American Welding Society, Apr. 22, 1999, http://www.aws.org/library/doclib/vision.pdf.
"Welding in Defense Industry," American Welding Society conference schedule, 2004. https://app.aws.org/conferences/defense/live_index.html.
"Welding Technology Roadmap," prepared by Energetics, Inc., Columbia, MD, in cooperation with The American Welding Society and The Edison Welding Institute, Sep. 2000.
123arc.com—"Weld into the future"; 2000.
123arc.com; Products; http://www.123arc.co/en/products/htm; accessed: Apr. 11, 2013.
Advance Program of American Welding Society Programs and Events, Nov. 11-14, 2007, Chicago.
Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.
Aiteanu, Dorin, et al., "A Step Forward in Manual Welding: Demonstration of Augmented Reality Helmet," Institute of Automation, University of Bremen, Germany, 2003.
Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).
American Welding Society Forms: typical Procedure Qualification Record and Welding Procedure Specification forms.
American Welding Society's Virtual Welding Trailer to Debut at FABTECH Careers in Welding Trailer Appeals to New Generation of Welders, Miami, Florida, Nov. 3, 2011.
ARC+ Virtual Welding Simulator; 123 Certification Inc.; Feb. 2009; Montreal, Quebec.
ArcSentry Weld Monitoring System, Version 3, Users Manual, Native American Technologies, Golden, CO, Dec. 10, 1999.
ARVIKA Forum Vorstellung Projeckt PAARA, BMW Group Virtual Reality Center, Nuernberg, 2003.
Ascension Technology Corporation: Tracking 3D Worlds: http://ascension-tech.com/, Dec. 1996.
Barckhoff, J.R.; "Total Welding Managemet," American Welding Society, 2005.
Bender Shipbuilding and Repair, Co., "Virtual Welding—A Low Cost Virtual Reality Welder Training System", Technical Proposal, Jan. 23, 2008.
Byrd, Alex Preston, "Identifying the effects of human factors and training methods on a weld training program" (2014). Graduate Theses and Dissertations. Paper 13991.
Central Welding Supply http://www.welders-direct.com/ Feb. 29, 2000.
Choquet, Claude, ARC+ & ARC PC Welding Simulators: Teach Welders with Virtual Interactive 3D Technologies; Jul. 2010.
Choquet, Claude, ARC+: Today's Virtual Reality Solution for Welders, Jun. 1, 2008.
Cote, Allan et al. (Presenters); Virtual Reality Welder Training; Project Review for Ship Tech 2005; Project No. S1051; Mar. 1, 2005; Biloxi MS.
Cybernetics: Enhancing Human Performance found in the DTIC Review dated Mar. 2001, p. 186/19. See http://www.dtic.mil/dtic/tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19-22, 2007.
EWI, "EWI ArcCheck," marketing brochure, Columbus, Ohio, 1 page.
EWI, "EWI SkillBuilder," marketing brochure, Columbus, Ohio, 1 page.
Fast et al., Virtual Training for Welding, Proceedings of the Third IEEE and ACM International Symposium on Mixed and Augmented Reality (ISMAR 2004); 0-7695-2191-6/04; 2004.
Fast, Kenneth, Jerry Jones, and Valerie Rhoades; "Virtual Welding—A Low Cost Virtual Reality Welder Training System Phase II," National Shipbuilding Research Program (NSRP), NSRP ASE Technology Investment Agreement No. 2010-357, Feb. 29, 2012, http://www.nsrp.org/3-RA-Panel_Final_Reports/FY08_Virtual_Welder_Final_Report.pdf.

(56) References Cited

OTHER PUBLICATIONS

Fite-Georgel, Pierre; "Is there a Reality in Industrial Augmented Reality?" 10th IEEE International Symposium on Mixed and Augmented Reality (ISMAR), 2011.
Fridenfalk et al., Design and Validation of a Universal 6D Seam Tracking System in Robotic Welding Based on Laser Scanning, Industrial Robotics: Programming, Simulation, and Application, ISBN 3-86611-286-6, pp. 702, ARS/pIV, Germany, Dec. 2006, edited by Kin Huat.
Fronius "The Ghost": http://www.fronius.com/cps/rde/xchg/SID-3202EAB7-AE082518/fronius_interational/hs.xsl/79_15490_ENG_HTML.htm; 2006.
Fronius International GmbH—Focus on Welding—Fronius Virtual Welding; http://www.fronius.com/cps/rde/xchg/SID-99869147-0110E322/fronius_intenational/hs_xsl/79_15490_ENG_HML.htm; 2006.
Fronius International; Product Description—Fronius Virtual Welding; http://www.fronius.com/cps/rde/xchg/SID-9C1850B-518E8F49/fronius_international/hs.xsl/79_15490_ENG_HTML.htm#produkt; accessed: Apr. 11, 2013.
Fronius Perfect Welding; 06,3082, EN v01 2010 aw05; Virtual Welding—The training method of the future; Feb. 20, 2012.
ftp://www.hitl.washington.edu/pub/scivw/publications/IDS-pdf/HAPTIC1.PDF, (University of Washington): Table 11, Tactile Feedback Actuator Technologies, p. 119, below the table is a. Based on Hasser (1995, 1996).
GAWDA—Welding & Gases Today Online GAWDA Media Blog; Will Games Turn Welding into a Virtual Market? Friday, Dec. 2, 2011; http://www.weldingandgasestoday.org/blogs/Devin-OToole/index.php/ta . . . .
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
Haptic Feedback for Virtual Reality by Grigore C. Burdea dated 1996.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Hillers, B, and Axel Graeser, "Direct welding arc observation withouth harsh flicker," FABTECH International and AWS Welding Show, 2007.
Hillers, B, and Axel Graeser, "Real time Arc-Welding Video Observation System," 62nd International Conference of IIW, Jul. 12-17, 2009, Singapore, 2009.
Hillers, B., et al.; "TEREBES: Welding Helmet with AR Capabilites," Institute of Automation, University of Bremen, and Institute of Industrial Engineering and Ergonomics, RWTH Aachen Universty, 2004.
Hillers, Bernd, Dorin Aiteanu, Axel Graser, "Augmented Reality—Helmet for the Manual Welding Process," Virtual and Augmented Reality Applications in Manufacturing, Institute of Automation, University of Bremen, 2004.
Himperich, Frederick, "Applications in Augmented Reality in the Automotive Industry," Fachgebiet Augmented Reality, Department of Informatics, Jul. 4, 2007, p. 1-21.
http://www.123arc.com "Simulation and Certification"; 2000.
Image from SimWelder.com—R-V's Welder Training Goes Virtual, www.rvii.com/PDF/simwelder.pdf; Jan. 2010.
Impact Spring 2012 vol. 12, No. 2, Undergraduate Research in Information Technology Engineering, University of Virginia School of Engineering & Applied Science; 2012.
Impact Welding: miscellaneous examples from current and archived website, trade shows, etc. See, e.g., http://www.impactwelding.com.
Integrated Microelectromechanical Gyroscopes; Journal of Aerospace Engineering, Apr. 2003 pp. 65-75 (p. 65) by Huikai Xie and Garry K. Fedder.
Jo et al., Visualization of Virtual Weld Beads, VRST 2009, Kyoto, Japan, Nov. 18-20, 2009; Electronics and Telecommunications Research Institute (ETRI) ACM 978-1 60558-869-8/09/0011.
Kiwinakiful; Holographic TV coming 2012 (as seen on BBC); http://www.youtube.com/watch?v=Ux6aD6vE9sk&feature=related, Jul. 2, 2011.
Kooima, Robert; Kinect +3D TV=Virtual Reality; http://www.youtube.com/watch?v=2MX1RinEXUM&feature=related, Feb. 26, 2011.
Leap Motion; https://www.leapmotion.com/, May 2012.
Lincoln Electric VRTEX Virtual Reality Arc Welding Trainer; http://www.lincolnelectric.com/en-us/equipment/training-equipment/pages/vrtex360.aspx; 1999.
Maccormick, John; How does the Kinect work?; http://users.dickinson.edu/~jmac/selected-talks/kinect.pdf, Dec. 1, 2011.
NAMeS Users Guide, N A Tech Neural Applications, Copyright 1997, 1998, 1999, 2000 Golden, CO (123 pages).
NAMeS, Native American Technologies Weld Measuring Software, Users Guide, 2000.
National Science Foundation—Where Discoveries Begin—Science and Engineering's Most Powerful Statements Are Not Made From Words Alone—Entry Details for NSF International Science & Engineering Visualization Challenge, Public Voting ended on Mar. 9, 2012; Velu the welder by Muralitharan Vengadasalam—Sep. 30, 2011; https://hsf-scivis.skild.com/skild2/NationalScienceFoundation/viewEntryDetail.action?pid . . . .
Native American Technologies, "ArcDirector Weld Controller" web page, http://web.archive.org/web/20020608125127/http://www.natech-inc.com/arcdirector/index.html, published Jun. 8, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modeling and Optimization" web pages, http:/web.archive.org/web/20020608125619/http://www.natech-inc.com/pna3/index.html, published Jun. 8, 2002.
Native American Technologies, "Process Improvement Products" web page, http://web.archive.org/web/20020608050736/http://www.natech-inc.com/products.html, published Jun. 8, 2002.
Natural Point, Trackir; http://www.naturalpoint.com/trackir/, Dec. 2003.
Cho, Min Hyn, Numerical Simulation F Arc Welding Process and its Application Dissertation for Ohio State University by Min Hyun Cho, M.S. 2006: See Internet as this document is security protected) ohttps://etd.ohiolink.edu/ap:0:0:APPLICATION_PROCESS=DOWNLOAD_ETD_SUB_DOC_ACCNUM:::F1501_ID:osu1155741113, attachment.
NZ Manufacturer Game promotes welding trade careers; http://nzmanufacturer.co.nz/2011/11/gme-promotes-welding-trade-careers/ . . . Compentenz Industry Training; www.competenz.org.nz; Game promotes welding trade careers, Nov. 7, 2011.
OptiTrack: Motion Capture Systems: http://www.naturalpoint.com/optitrack/, Mar. 2005.
PCT International Search Report for PCT Application No. PCT/US2013/025050 mailed Jun. 7, 2013, 16 pgs.
PCT International Search Report for PCT Application No. PCT/US2013/025071 mailed Jun. 7, 2013, 13 pgs.
PCT International Search Report for PCT Application No. PCT/US2013/025081 maile Jne 7, 2013, 11 pgs.
Penrod, Matt; "New Welder Training Tools," EWI PowerPoint presentation, 2008.
PhaseSpace: Optical Motion Capture: http://phasespace.com/, 2009.
Playstation; Move Motion Controller: http://us.playstation.com/ps3/playstation-move/, Mar. 2010.
Polhemus: Innovation in Motion: http://polhemus.com/?page=researchandtechnology, 1992.
Porter et al., EWI-CRP Summary Report SR0512, Jul. 2005—Virtual Reality Welder Training.
Porter, Nancy C., Edison Welding Institute; J. Allan Cote, General Dynamics Electrict Boat; Timothy D. Gifford, VRSim; and Wim Lam, FCS Controls—Virtual Reality Welder Training—Project No.

(56) References Cited

OTHER PUBLICATIONS

S1051 Navy Man Tech Program; Project Review for Ship Tech 2005,—Mar. 1, 2005, Biloxi, MS, http://www.nsrp.org/6-Presentations/WD/Virtual_Welder.pdf.
Porter, Nancy C., Edison Welding Institute; J.Allan Cote, General Dynamics Electric Boat; Timoty D. Gifford, VRSim; and Wim Lam, FCS Controls—Virtual Reality Welder Training—Session 5; Joining Technologies for Naval Applications: 2007.
Quebec International, May 28, 2008 'Video Game' Technology to Fill Growing Need; http://www.mri.gouv.qc.ca/portail/_scripts/actualities/viewnew.sap?NewID=5516.
Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.
Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.
Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.
ShotOfFuel; Wii Head Tracking for 3D, http://www.youtube.com/watch?v=1x5ffF-0Wr4, Mar. 19, 2008.
Stone, R. T., K. Watts, and P. Zhong, "Virtual Reality Integrated Welder Training, Welding Research," Welding Journal, vol. 90, Jul. 2011, pp. 136-s-141-s, https://app.aws.org/wj/supplement/wj201107_s136.pdf.
TCS News & Events: Press Release: TCS wins the "People Choice" award from National Science Foundation, USA, pp. 1-6; Press Release May 21, 2012; http://www.tsc.com/news_events/press_releases/Pages/TCS_People_Choice_award_Natio . . . .
TeachWELD: Welding Simulator/Hands-On Learning for Welding: http://realityworks.com/products/teachweld-welding-simulator; 2012.
TEREBES; miscellaneous examples from http://www.terebes.uni-bremen.de.
The Rutgers Master II—New Design Force-Feedback Glove by Mourad Bouzit, Member, IEEE, Grigore Burdea, Senior Member, IEEE, George Popescu, Member, IEEE, and Rares Bolan, Student Member, found in IEEE/ASME Transactions on Mechatronics, vol. 7, No. 2, Jun. 2002.
thefabricator.com—Arc Welding Article; Heston, Tim, Virtual welding—Training in a virtual environment gives welding students a leg up—Mar. 11, 2008.
Tschirner, Petra, Hillers, Bernd, and Graeser, Axel; "A Concept for the Application of Augmented Reality in Manual Gas Metal Arc Welding," Proceedings of the International Symposium on Mixed and Augmented Reality, 2002.
Vicon: Motion Capture Systems: http://vicon.com/, Dec. 1998.
Virtual Reality Training Manual Module 1—Training Overview—A Guide for Gas Metal Arc Welding—EWI 2006.
VRTEX Virtual Reality Arc Welding Trainer, Lincoln Electric; http://www.lincolnelectric.cm/en-us/equipment/training-equipment/Pages/vrtex.aspx; accessed: Apr. 11, 2013.
Welding Journal, American Welding Society, Nov. 2007, https://app.aws.org/wj/2007/11/WJ_2007_11.pdf.
White, S., et al., "Low-Cost Simulated MIG Welding for Advancement in Technical Training," Virtual Reality, 15, 1, 69-81, Mar. 2011. ISSN:13594338 [Retrieved from EBSCOhost, Jun. 15, 2015].

\* cited by examiner

HELMET-INTEGRATED WELD TRAVEL SPEED SENSING SYSTEM AND METHOD

CROSS REFERENCE TO RELATED APPLICATIONS

This application is a continuation of U.S. patent application Ser. No. 16/828,178 filed Mar. 24, 2020, which is a continuation of U.S. patent application Ser. No. 15/369,474, filed Dec. 5, 2016, which is a continuation of U.S. patent application Ser. No. 13/755,984, entitled "Helmet-Integrated Weld Travel Speed Sensing System and Method," filed Jan. 31, 2013, which claims priority to and benefit of U.S. Patent Application No. 61/597,556, entitled "Weld Travel Speed Sensing Systems and Methods," filed Feb. 10, 2012, each of which is herein incorporated by reference.

BACKGROUND

The invention relates generally to welding systems, and, more particularly, to sensing systems for monitoring a travel speed of a welding torch during a welding operation.

Welding is a process that has become ubiquitous in various industries for a variety of types of applications. For example, welding is often performed in applications such as shipbuilding, aircraft repair, construction, and so forth. While these welding operations may be automated in certain contexts, there still exists a need for manual welding operations. In some manual welding operations, it may be desirable to monitor weld parameters, such as the travel speed of the welding torch, throughout the welding operation. While the travel speed of an automated torch may be robotically controlled, the travel speed of the welding torch in manual operations may depend on the operator's welding technique and pattern. Unfortunately, it may be difficult to measure this weld motion during a welding operation due to features of the welding environment, operator considerations, and so forth.

BRIEF DESCRIPTION

In a first embodiment, a welding system includes a first sensor associated with a welding helmet and configured to sense a parameter indicative of a position of a welding torch relative to the welding helmet. The travel speed sensing system also includes a processing system communicatively coupled to the first sensor and configured to determine a position of the welding torch relative to a workpiece based on the sensed first parameter.

In another embodiment, a travel speed sensing system includes an optical sensor disposed on a welding helmet and configured to sense a first parameter indicative of a position of a welding torch relative to the welding helmet and a second parameter indicative of a position of a component in a weld area. The travel speed sensing system also includes a processing system communicatively coupled to the optical sensor and configured to determine a travel speed of the welding torch based on the first and second sensed parameters.

In a further embodiment, a travel speed sensing system includes a sensor disposed in a welding helmet and configured to identify an action performed by a welding operator wearing the welding helmet. The travel speed sensing system also includes a processing system communicatively coupled to the sensor and configured to determine a travel speed of the welding torch based on a time between the actions identified by the sensor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
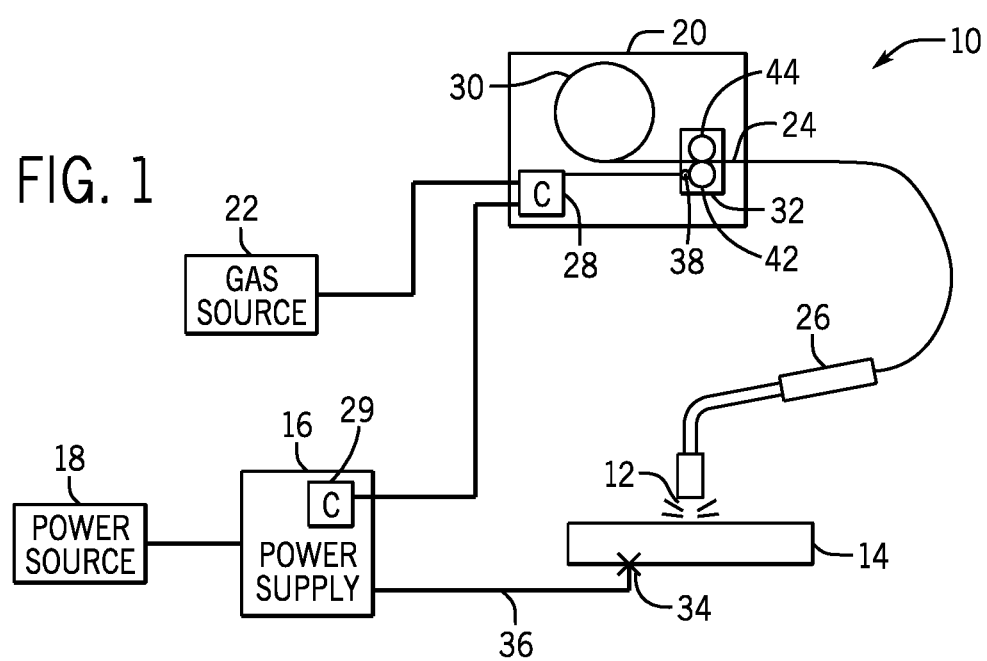
FIG. 1 is a block diagram of an embodiment of a welding system utilizing a welding torch.

As described in detail below, provided herein are systems and methods for determining the travel speed of a welding device during a welding operation. The foregoing systems and methods may be used separately or in combination to obtain information during the welding operation relating to the three dimensional speed of the welding torch along the surface of the metal as the metal is being welded. In some embodiments, these methods may be utilized during unconstrained or manual welding operations to offer advantages over traditional systems in which it may be difficult to measure the weld motion. However, the foregoing systems and methods may be utilized in a variety of suitable welding systems, such as automated or robotic systems.

Present embodiments are directed toward systems and methods for sensing a travel speed of a welding torch using a helmet-integrated system. More specifically, the disclosed systems include a travel speed sensing system that monitors a parameter associated with the welding system via a sensor associated with a welding helmet worn by an operator. The term "associated" in this context may refer to the sensor being disposed on, physically coupled to, or in communication with the welding helmet. The parameter is indicative of a travel speed of a welding torch used in the welding system, and the travel speed sensing system is configured to detect a position and an orientation of the welding torch relative to a workpiece based on the monitored parameter. The travel speed sensing system may determine various parameters from the determined position and orientation, such as the travel speed of the welding torch.

In some embodiments, the sensor associated with the welding helmet may be utilized to monitor a position of the welding torch relative to the welding helmet. Such embodiments may also include one or more sensors for monitoring a position of the welding helmet, and the travel speed sensing system is configured to determine or detect the travel speed based on both monitored positions. In other embodiments, a sensor disposed on the welding helmet may acquire images of a weld area. The travel speed sensing system may process the acquired images to determine both a position of the welding torch relative to the welding helmet and a position of a stationary component in the weld area relative to the helmet. Based on the two relative positions, the travel speed sensing system is configured to determine or detect the position and orientation of the welding torch relative to the component in the weld area, and/or the travel speed, based on these monitored positions. In still other embodiments, a sensor disposed on the welding helmet may send a signal based on an operator-performed action, such as a sound from the operator, to determine the position of the welding torch. Specifically, the sensor may be a microphone used to identify sounds or words spoken by the operator when the welding torch passes by identifying marks on a welding workpiece. By monitoring changes in position of the welding torch via a sensor associated with the welding helmet, the travel speed sensing system may determine a change in spatial location of the welding torch with respect to time. The welding operator maintains an unobstructed view of the welding torch via the welding helmet, ensuring a consistent line of sight for the sensor associated with the welding helmet for determining the welding torch position.

Similar techniques may be applied to determine other information related to a position of the welding torch with respect to the welding environment, based on parameters (e.g., position and orientation of the welding torch relative to the workpiece) monitored via a helmet-associated sensor. That is, in addition to or in lieu of determining travel speed of the welding torch, the travel speed sensing system may be configured to determine a work angle of the welding torch, a travel angle of the welding torch, a travel direction of the welding torch, a tip-to-work distance of the welding torch, proximity of the weld to the joint of the workpiece, or some combination thereof. Each of these parameters may be utilized separately or in combination to evaluate weld quality. To determine such information, it may be desirable for the travel speed sensing system to know where the joint is located so that the position and orientation of the welding torch relative to the joint may be determined. This may involve applying a calibration procedure in some embodiments. In other embodiments, the joint may be positioned relative to sensors of the travel speed sensing system before the welding is performed.

Turning now to the figures, FIG. 1 is a block diagram of an embodiment of a welding system 10 in accordance with the present techniques. The welding system 10 is designed to produce a welding arc 12 on a workpiece 14. The welding arc 12 may be of any type of weld, and may be oriented in any desired manner, including MIG, metal active gas (MAG), various waveforms, tandem setup, and so forth. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding torch 26 is configured to generate the welding arc 12 between the welding torch 26 and the workpiece 14. The welding wire 24 is fed through the welding torch 26 to the welding arc 12, melted by the welding arc 12, and deposited on the workpiece 14.

The wire feeder 20 will typically include control circuitry, illustrated generally by reference numeral 28, which regulates the feed of the welding wire 24 from a spool 30, and commands the output of the power supply 16, among other things. Similarly, the power supply 16 may include control circuitry 29 for controlling certain welding parameters and arc-starting parameters. The spool 30 will contain a length of welding wire 24 that is consumed during the welding operation. The welding wire 24 is advanced by a wire drive assembly 32, typically through the use of an electric motor under control of the control circuitry 28. In addition, the workpiece 14 is coupled to the power supply 16 by a clamp 34 connected to a work cable 36 to complete an electrical circuit when the welding arc 12 is established between the welding torch 26 and the workpiece 14.

Placement of the welding torch 26 at a location proximate to the workpiece 14 allows electrical current, which is provided by the power supply 16 and routed to the welding torch 26, to arc from the welding torch 26 to the workpiece 14. As described above, this arcing completes an electrical circuit that includes the power supply 16, the welding torch 26, the workpiece 14, and the work cable 36. Particularly, in operation, electrical current passes from the power supply 16, to the welding torch 26, to the workpiece 14, which is typically connected back to the power supply 16 via the work cable 36. The arcing generates a relatively large amount of heat that causes part of the workpiece 14 and the filler metal of the welding wire 24 to transition to a molten state, thereby forming the weld.

To shield the weld area from being oxidized or contaminated during welding, to enhance arc performance, and to improve the resulting weld, the welding system 10 also feeds an inert shielding gas to the welding torch 26 from the gas source 22. It is worth noting, however, that a variety of shielding materials for protecting the weld location may be employed in addition to, or in place of, the inert shielding gas, including active gases and particulate solids.

Presently disclosed embodiments are directed to a welding helmet-based travel speed sensing system used to detect a change in position of the welding torch 26 over time throughout the welding process. In some embodiments, the travel speed of the welding torch 26 may refer to a change in three dimensional position of the welding torch with respect to time. In other embodiments, the travel speed of the welding torch 26 may refer to a change in two dimensional position of the welding torch 26 within a plane parallel to a welded surface of the workpiece 14. Although FIG. 1 illustrates a gas metal arc welding (GMAW) system, the presently disclosed techniques may be similarly applied across other types of welding systems, including gas tungsten arc welding (GTAW) systems and shielded metal arc welding (SMAW) systems. Accordingly, embodiments of the welding helmet-based travel speed sensing systems may be utilized with welding systems that include the wire feeder 20 and gas source 22 or with systems that do not include a wire feeder and/or a gas source, depending on implementation-specific considerations.

Figure 2:
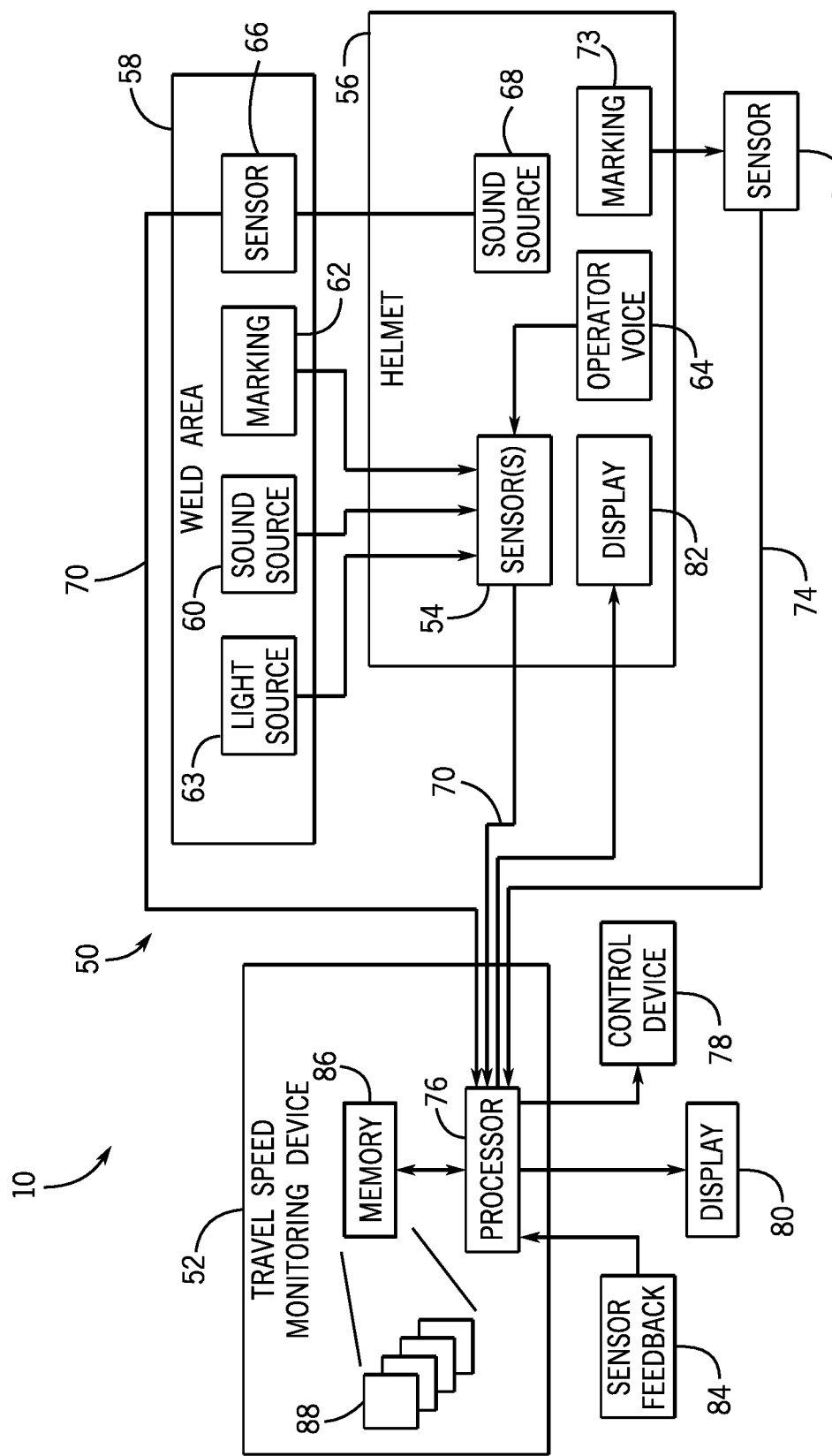
FIG. 2 is a block diagram of an embodiment of the welding system of FIG. 1, including a travel speed sensing system for detecting a travel speed of the welding torch.

FIG. 2 is a block diagram of an embodiment of the welding system 10, including a travel speed sensing system 50 in accordance with presently disclosed techniques. The travel speed sensing system 50 may include, among other things, a travel speed monitoring device 52 configured to process signals received from one or more sensors 54 incorporated with a welding helmet 56. The welding helmet 56 is worn by an operator using the welding torch 26. The sensors 54 incorporated with the welding helmet 56 may be utilized to determine a position of the welding torch 26 relative to the welding helmet 56.

The sensors 54 may be any desirable type of sensor that produces an electrical signal indicative of a position of the welding torch 26 within a weld area 58. For example, the sensors 54 may include an array of microphones disposed on the welding helmet 56 and configured to detect a sound emitted from a sound source 60. The sound source 60 may include the welding arc 12, a sound emitter disposed on the welding torch 26, or any other sound source 60 indicative of a position of the welding torch 26 operating in the weld area 58. In other embodiments, the sensors 54 may include one or more optical sensors disposed on the welding helmet 56 and configured to sense a marking 62 indicative of a position of the welding torch 26. Alternatively, the optical sensor(s) on the welding helmet 56 may be configured to sense a light emitted from a light source 63 (e.g., welding arc 12) of the welding torch 26. In still other embodiments, the one or more sensors 54 may include a microphone disposed in the welding helmet 56 and configured to identify an operator voice 64 indicative of welding torch position. In further embodiments, the one or more sensors associated with the welding helmet 56 may include a sensor 66 (e.g., a sound sensor) disposed on the welding torch 26 and configured to monitor a sound output from a sound source 68 located on the welding helmet 56. Other types of sensors may be associated with the welding helmet 56 to help determine position of the welding torch 26.

The one or more sensors 54, 66 may send signals 70 indicative of welding torch position to the travel speed monitoring device 52. In some embodiments, the travel speed sensing system 50 may include additional sensors 72 at a fixed location relative to the workpiece 14. These additional sensors 72 may be used to determine a position and orientation of the welding helmet 56 relative to the workpiece 14. In some embodiments, for example, the welding helmet 56 may include a marking 73 that may be detected via the sensors 72 to determine a position or orientation of the welding helmet 56. The sensors 72 may send signals 74 indicative of this position to the travel speed monitoring device 52. The travel speed monitoring device 52 may then determine a position of the welding torch 26 based on both the monitored position/orientation of the welding torch 26 (relative to the welding helmet 56) and the monitored position/orientation of the welding helmet 56 (relative to the sensors 72). That is, the travel speed sensing system 50 may receive the signals 70 and the signals 74, and determine the travel speed of the welding torch 26 based on these signals 70 and 74.

As noted above, the sensors 72 may be positioned stationary with respect to the workpiece 14 during welding. Different methods may be applied to determine, or ensure the consistency of, the position and orientation of the sensors 72 relative to the workpiece 14. In some embodiments, the workpiece 14 may be placed in any spatial relationship to the sensors 72, and a calibration scheme may be applied via the weld travel speed system 50. For example, the welding torch 26 may be placed at one or more known positions relative to the workpiece 14, and sensor measurements taken at these positions may be used to calibrate the spatial relationship between the workpiece 14 and the sensors 72. In other embodiments, a fixture or marking in the weld area 58 may indicate a location for the workpiece 14 to be placed relative to the sensors 72 (or vice versa). The travel speed sensing system 50 may be designed to account for this particular relative placement of the workpiece 14 and the sensors 72.

The weld area 58 may include a weld cell within which a welding operator uses the welding torch 26 to perform a welding operation. In some embodiments, the weld area 58 may include a surface or structure upon which the workpiece 14 is located throughout the welding process, or the workpiece 14 itself. The weld area 58 may include any three-dimensional space within which a welding operation is performed via the welding system 10.

As shown, the travel speed monitoring device 52 may include a processor 76, which receives inputs such as sensor data from the sensors 54, 66 and/or the sensors 72 via their respective signals 70 and 74. Each signal may be communicated over a communication cable, or wireless communication system, from the one or more sensors 54, associated with the welding helmet 56. In an embodiment, the processor 76 may also send control commands to a control device 78 of the welding system 10 in order to implement appropriate actions within the welding system 10. For example, the control device 78 may control a welding parameter (e.g., power output, wire feed speed, gas flow, etc.) based on the determined travel speed of the welding torch 26. The processor 76 also may be coupled with a display 80 of the travel speed monitoring device 52, and the display 80 may provide a visual indicator of the travel speed of the welding torch 26 based on the determined travel speed. In certain embodiments, the processor 76 may be coupled with a display 82 in the welding helmet 56, wherein the display 82 is used to provide visual indicators of the travel speed of the welding torch 26 directly to the welding operator as the operator is performing the weld. The processor 76 may receive additional sensor feedback 84 from the welding system 10, in order to monitor other welding parameters. These other welding parameters may include, for example, a heat input to the workpiece 14.

The processor 76 is generally coupled to a memory 86, which may include one or more software modules 88 that contain executable instructions, transient data, input/output correlation data, and so forth. The memory 86 may include volatile or non-volatile memory such as magnetic storage memory, optical storage memory, or a combination thereof. Furthermore, the memory 86 may include a variety of machine readable and executable instructions (e.g., computer code) configured to provide a calculation of weld travel speed, given input sensor data. Generally, the processor 76 receives such sensor data from the one or more sensors 54, 66 associated with the welding helmet 56, and references data stored in the memory 86 to implement such calculation. In this way, the processor 76 is configured to determine a travel speed of the welding torch 26, based at least in part on the signals 70.

In some embodiments, the travel speed sensing system 50 may be provided as an integral part of the welding system 10 of FIG. 1. That is, the travel speed sensing system 50 may be integrated into a component of the welding system 10, for example, during manufacturing of the welding system 10. For example, the power supply 16 may include appropriate computer code programmed into the software to support the travel speed sensing system 50. However, in other embodiments, the travel speed sensing system 50 may be provided as a retrofit kit that may enable existing welding systems 10 with the helmet-integrated travel speed sensing capabilities described herein. The retrofit kit may include, for example, the travel speed sensing system 50, having the processor 76 and the memory 86, as well as one or more sensors 54 from which the travel speed sensing system 50 receives sensor input. In some embodiments, the retrofit kit may also include the welding helmet 56 having the sensors 54, display 82, sound source 68, and/or marking 73 installed thereon, in addition to the welding torch 26 having the sensor 66, sound source 60, light source 63, and/or marking 62 installed thereon. To that end, such retrofit kits may be configured as add-ons that may be installed onto existing welding systems 10, providing travel speed sensing capabilities. Further, as the retrofit kits may be installed on existing welding systems 10, they may also be configured to be removable once installed.

Figure 3:
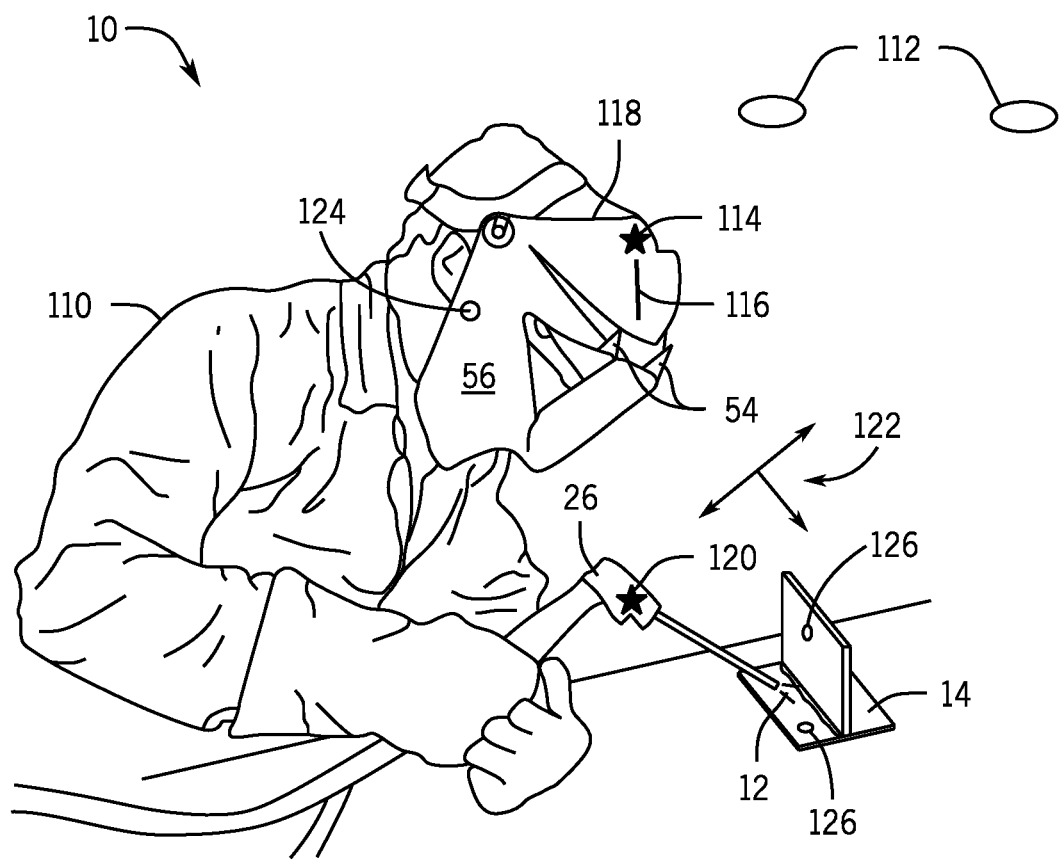
FIG. 3 is a perspective view of an embodiment of the welding system of FIGS. 1 and 2, including a welding helmet with associated sensors for determining weld travel speed of the welding torch.

FIG. 3 is a perspective view of an embodiment of the welding system 10 capable of monitoring a position of the welding helmet 56 to determine the travel speed of the welding torch 26. In the depicted welding system 10, an operator 110 is wearing the welding helmet 56 while welding. External helmet position detection sensors 112 are located near the operator 110 to assess the position and orientation of the weld helmet 56. As noted previously, the welding helmet 56 may be augmented with markings 73 (e.g., visual markings 114 and 116), transducers, or sensors that operate in conjunction with the external helmet position detection sensors 112 to enable the position and orientation of the welding helmet 56 to be tracked during the welding operation. In some embodiments, the markings 73 used to determine the location of the welding helmet 56 may also include geometric features or edges 118 used as indicia for helmet position and orientation determination. One or more sensors (e.g., sensors 54) or transducers on the welding helmet 56 may then be used to locate the relative position or motion of the welding torch 26, the welding arc 12, or a sensor/transducer/target 120 (e.g., marking 62) on the welding torch 26. In certain embodiments, by combining the motion of the welding helmet 56 with the relative motion of the welding torch 26, the travel speed sensing system 50 may calculate the weld travel speed of the welding torch 26 relative to the workpiece 14.

It should be noted that the sensors 112 may include, or be replaced by, any method or device capable of detecting the position of the welding helmet 56. For example, the sensors 112 may include a stereo vision camera located overhead to determine the location and orientation of the welding helmet 56. Another stereo vision camera may be located on the welding helmet 56 (e.g., sensors 54) to locate the relative position of the welding arc 12. The sensors 112 may include optical sensors for determining the position of the welding helmet 56 by determining a position of a predefined point, such as the markings 114, 116, or the edge 118, on the welding helmet 56. The markings 114, 116 may include passive visual markings that reflect light, or active visual markings that include infrared LEDs. In some embodiments, in order to provide reliable weld travel speed estimates, the helmet location determination may be supplemented with a measure of an orientation 122 in three-dimensions of the welding helmet 56 (three orthogonal rotation angles defining the helmet direction). The orientation may be visually determined, for example, via helmet markings (e.g., markings 114, 116) or geometric features (e.g., edge 118) detected by a plurality of camera imagers external to the welding helmet 56. Additionally, in another embodiment, the orientation 122 may be obtained from sensors 124 (e.g., inclinometers, triaxial accelerometers, etc.) mounted to the welding helmet 56.

In still other embodiments, the sensors 112 may include a single optical sensor configured to detect structured light projected onto the welding helmet 56 from a light source external to the welding helmet 56. The light source may include a point source at a fixed location relative to the camera (sensor 112). The light source may project a grid or other structured pattern toward the welding helmet 56. Wherever the pattern strikes the welding helmet 56, the light may produce a pattern indicative of the shape and distance of the welding helmet 56 from the camera. As the light hits the welding helmet 56 from different angles, the projected grid may become distorted based on the contours of the welding helmet 56. The welding helmet 56 may be shaped such that the distorted grid may be utilized to identify a position, distance, and orientation of the welding helmet 56 via image processing of images acquired via the camera. The structured light could include an array of points, circles, stripes, or any desirable collection of light patterns that can be recognizable.

There may be any number of techniques used to determine a position of the welding torch 26 relative to the welding helmet 56 over time. For example, in some embodiments the sensors 54 disposed on the welding helmet 56 may include a microphone array disposed on the welding helmet 56 and configured to monitor a sound output from the welding torch 26. The sound may be emitted from a sound emitter disposed on the welding torch 26, or the sound may come directly from the welding arc 12 generated by the welding torch 26. In another embodiment, the sensors 54 may include any desirable optical sensor configured to detect light emitted from the arc 12 produced by the welding torch 26, or to detect a target 120 disposed on the welding torch 26.

In other embodiments, the sensors associated with the welding helmet 56 may be located on the welding torch 26 and configured to communicate with the welding torch 26 (e.g., via one or more emitters disposed on the welding torch 26). More specifically, the sensors 54 may be replaced altogether with one or more sound emitters (e.g., sound source 68) to output sound toward the welding torch 26. In such embodiments, the welding torch 26 is equipped with one or more sensors 66 configured to detect when one or more sounds emitted from the welding helmet 56 reach the welding torch 26. The travel speed monitoring device 52 may use time of flight trilateration methods to determine travel speed of the welding torch 26 based on the detected sounds. Similarly, the welding helmet 56 may be equipped with one or more light emitters, or a target (similar to or same as the markings 114, 116). The one or more sensors 66 on the welding torch 26 may include optical sensors for detecting changes in the emitted light, or the markings. The travel speed sensing system 50 may then determine a position of the welding torch 26 relative to the welding helmet 56 based on the detected light or images.

Regardless of the method utilized to determine the helmet location and orientation, the sensors 54 or emitters (e.g., sound source 68) may be placed on the side of the welding helmet 56 facing the weld that will allow the relative position of the welding torch 26 to be measured. Techniques discussed above, including a microphone array to locate the weld arc sound (or other emitted sound), a stereo vision camera to triangulate the welding arc 12, and an emitter array with a sound sensor on the welding torch 26, may all be fitted onto the welding helmet 56 to track the position of the welding torch 26.

In some embodiments, the welding helmet 56 may include an optical sensor (e.g., camera) configured to sense a first parameter indicative of a position of the welding torch 26 relative to the welding helmet 56 and a second parameter indicative of a position of a component in the weld area 58. The travel speed sensing system 50 may determine the travel speed of the welding torch 26 based on these first and second monitored parameters. This travel speed determination may be based on a determined position and orientation of the welding torch relative to the component in the weld area. The component in the weld area 58 may include the workpiece 14 or any other component that is substantially stationary within the weld area 58 and within a line of sight of the welding helmet 56. In such instances, the workpiece 14 (or other component) may be prepared with one or more visual features 126 used for weld travel speed determination. The features 126 may be planar visual markings, so that the images collected may provide information related to position and orientation of the component relative to the welding helmet 56. The features 126 may be applied to the workpiece 14 via a rubber stamp, such that the stamped feature 126 reflects visible light. In some embodiments, multiple features 126 may incrementally mark off a specific distance along an edge of the workpiece 14. The optical sensors 54 (e.g., camera) on the welding helmet 56 may sense the features 126 on the workpiece 14 along with the target 120 on the welding torch 26. The travel speed monitoring device 52 may then utilize any desirable image processing scheme to determine weld travel speed from changes in relative position of the welding torch 26 versus the features 126.

Figure 4:
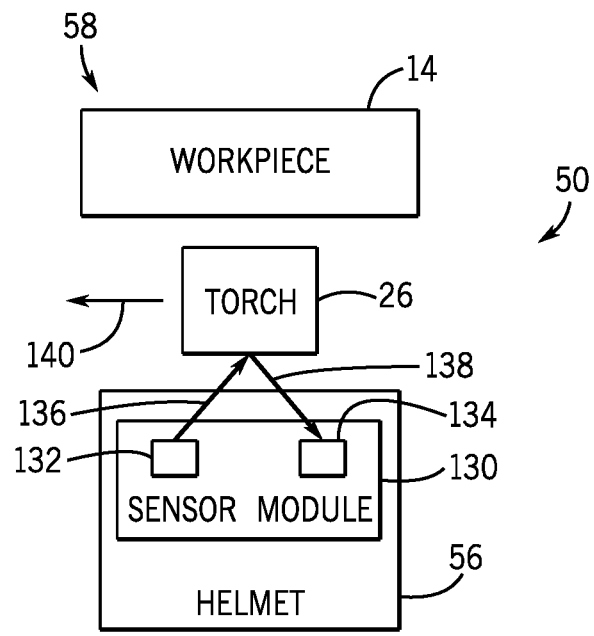
FIG. 4 is a block diagram of an embodiment of the travel speed sensing system of FIG. 2, including a sensor module disposed on a welding helmet for determining weld travel speed of the welding torch.

Other suitable techniques, not discussed above, may be utilized to measure the relative welding torch position given the proximity and guaranteed line or sight of the welding helmet 56 to the welding torch 26. As an example, FIG. 4 is a block diagram of an embodiment of the travel speed sensing system 50, including a sensor module 130 disposed on the welding helmet 56 for determining weld travel speed of the welding torch 26 relative to the welding helmet 56. The sensor module 130 may be equipped with both an emitter 132 and a corresponding sensor 134. The illustrated emitter 132 is configured to emit a light, structured light pattern, sound, wavelength of energy, or other detectable signal 136 toward the weld area 58. Similarly, the sensor is configured to detect a portion 138 of the signal 136 that is reflected from a surface of the welding torch 26. As the welding torch 26 is moved relative to the welding helmet 56 (e.g., arrow 140), the portion 138 of reflected signal may change based on the changing surface of the welding torch 26. Based on the detected reflection, the travel speed monitoring device 52 may determine a position of the welding torch 26 relative to the welding helmet 56. The sensor module 130 may utilize techniques including, but not limited to, radar, LIDAR, ultrasonic echo location, pattern recognition, and modulated light intensity. The sensor module 130 maintains a relatively consistent line of sight to the welding torch 26 throughout a welding operation, as the operator 110 moves the welding helmet 56 to track the progress of the weld.

Figure 5:
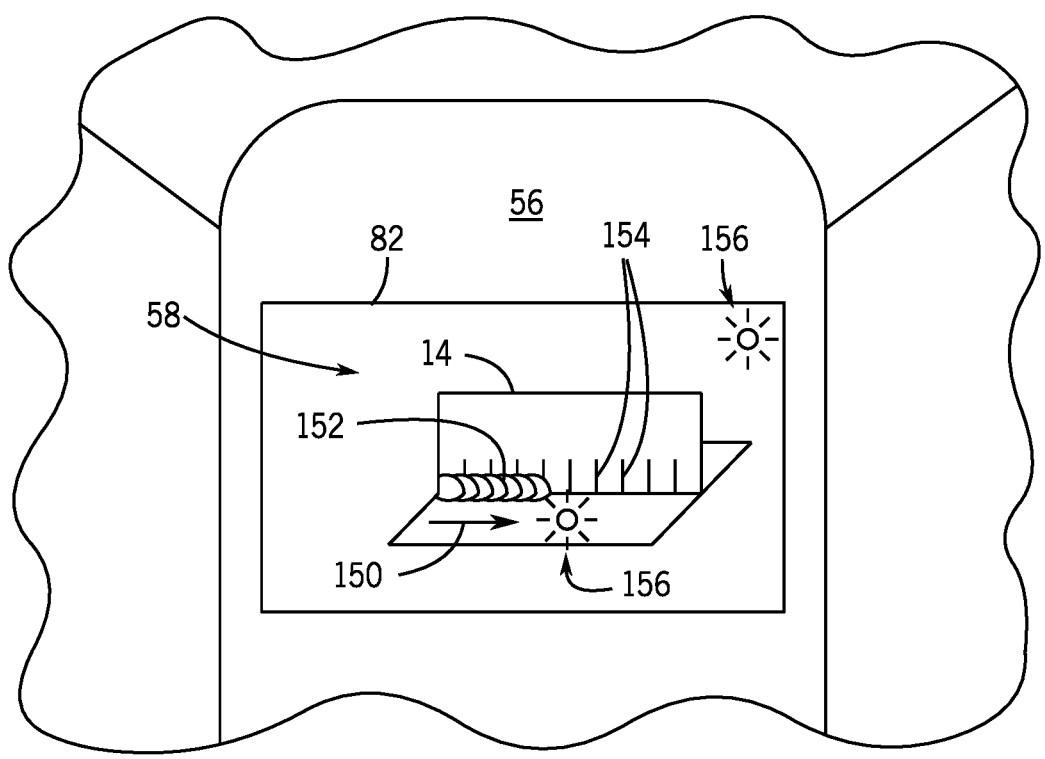
FIG. 5 illustrates an embodiment of a display in the welding helmet of FIG. 3 for displaying weld travel speed related parameters to a welding operator.

As noted above with respect to FIG. 2, the travel speed sensing system 50 may include a display 82 located in the welding helmet 56, configured to display parameters related to the weld travel speed of the welding torch 26. FIG. 5 illustrates an embodiment of the display 82, showing some parameters that may be displayed to the operator 110. The welding system 10 may be equipped to provide an augmented reality view of the weld area 58 via the display 82 of the welding helmet 56. That is, the welding helmet 56 may be configured to display, in addition to or in lieu of the actual welding environment as visible from the welding helmet 56, an augmented visualization of one or more reference points within the weld area 58. The augmented visualization may provide visual guides to direct the operator 110 to move the welding torch 26 at an appropriate travel speed for inputting a desired amount of heat to the workpiece 14.

In some embodiments, the travel speed sensing system 50 may determine a plane of reference based on sensor information (e.g., from a camera mounted on the welding helmet 56), and display the plane of reference on the display 82. This plane of reference may, in some embodiments, include an image of the entire weld area 58, including the workpiece 14 and the welding torch 26. In other embodiments, the display 82 may include a spatial representation of the welding joints of the workpiece 14, such as the T-joint intersection shown in FIG. 5. Any part of the constructed image that is blocked from view, or otherwise not accessible to the camera, may be extrapolated into the image formed via the display 82 based on the available image data.

The display 82 may overlay the image of the workpiece 14, as seen through the welding helmet 56, with certain marks, lines, blinking points, etc., to indicate a desired weld travel speed for the operator 110 to track with the welding torch 26. The display 82 may show, for example, an arrow 150 that moves in the direction of the weld 152 at the desired weld travel speed. This weld travel speed may be determined via the travel speed monitoring device 52, based on voltage and current measurements taken from the power supply 16 (via sensor feedback 84) and based on the configuration of the workpiece 14 and the welding application. Changing the weld travel speed affects the amount of heat input to the workpiece 14, so it may be desirable for the display 82 to provide a visualization corresponding to a desirable weld travel speed for providing the correct amount of heat to the workpiece 14. In other embodiments, the display 82 may show incremental markings 154 on the workpiece 14 to help the operator 110 control the pace of welding. Such markings 154 may be overlaid onto the image provided via the display 82, or the workpiece 14 itself may be prepared with the markings 154. If the markings 154 are present on the actual workpiece 14, the markings 154 could be passive or reflective markers, or they could be infrared LEDs, blinking markers, stamps, electronic ink, or any other suitable form of marker that could be applied to the workpiece 14. The display 82 may provide one or more blinking indicators 156 that are shown on the display and configured to blink whenever the welding torch 26 should pass the next incremental marking 154 to maintain the desired weld travel speed.

In certain other embodiments, the augmented reality available through the welding helmet 56 may provide indicators (e.g., textual or visual) to the operator 110 to describe how the operator 110 should adjust the weld travel speed of the welding torch 26. For example, the travel speed monitoring device 52 may determine the current travel speed of the welding torch 26, determine a desired travel speed of the welding torch 26 based on the sensor feedback 84 discussed above, and compare the weld travel speeds. If the monitored travel speed of the welding torch 26 is too fast or too slow, the display 82 may provide appropriate indicators to notify the operator 110 during the welding process.

Figure 6:
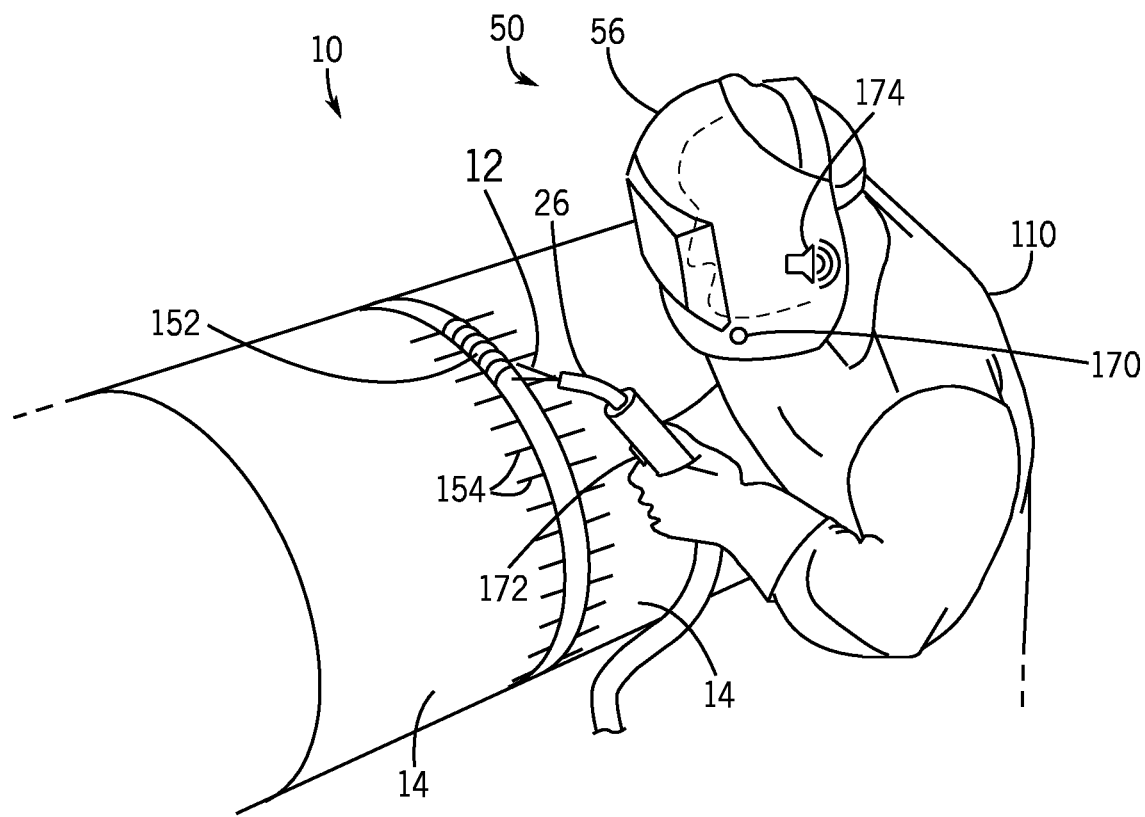
FIG. 6 is a perspective view of an embodiment of the welding system of FIG. 2, including a microphone disposed on a welding helmet for determining a travel speed of the welding torch based on a sensed welding operator voice.

As mentioned above with respect to FIG. 2, the sensors 54 incorporated with the welding helmet 56 may include a microphone 170 configured to detect an audible signal from the operator's voice 64. A perspective view of one such embodiment of the welding system 10 is provided in FIG. 6. In this embodiment, the workpiece 14 includes markings 154 that were previously applied to the joint area that is visible to the operator 110 during welding. Throughout the welding operation, the operator 110 may give an audible indication when the weld 152 or the welding torch 26 reaches each marking 154. The travel speed sensing system 50 may determine the weld travel speed of the welding torch 26 based on the timing of each audible signal given by the operator 110.

In the illustrated embodiment, the markings 154 are applied to each of the two workpieces 14 that are being welded together, however in other embodiments the markings 154 may be applied to just one side. As noted above, these markings 154 may include any suitable marking for preparing the workpiece 14, such as reflective markers, passive markers, infrared LEDs, and/or electronic ink markers. Regardless of the type of marker used, it is desirable for the markings 154 to be capable of withstanding high heat associated with the welding application. The operator 110 may say an identifiable word (e.g., "mark") when each incremental marking 154 is reached. The microphone 170 may wirelessly transmit the detected sound signal to the travel speed monitoring device 52 for processing. Based on the timing of each identifiable word in the signal, the travel speed monitoring device 52 may determine the weld travel speed of the welding torch 26. Because this embodiment of the travel speed sensing system 50 relies on the operator 110 identifying the markings 154, it may be unlikely for weld travel speed determination to be compromised due to sensors being out of a line of sight of the welding event. In addition, there is no need for additional sensors to determine a position of the welding helmet 56.

Other techniques for indicating the travel speed of the welding torch 26 may be implemented through actions of the operator 110. For example, in some embodiments, the operator 110 may apply pressure to a pressure sensor disposed in the welding helmet 56. The pressure sensor may detect a pressure applied to a pacifier via the operator's mouth, or a pressure applied to a jaw strap via the operator's jaw movements. In other embodiments, the operator 110 may depress a button 172 disposed on the welding torch 26 whenever the welding torch 26 or the welding arc 12 pass by one of the markings 154. The travel speed monitoring device 52 may then determine weld travel speed based on the timing of each depression of the button 172.

In some embodiments, the markings 154 may include blinking indicators (e.g., infrared LEDs) that blink at a pace indicative of a target weld travel speed. That is, the markings 154 may blink at a pace at which the welding torch 26 should be passing each of the markings 154. This target travel speed may be determined based on monitored voltage, current, and desired heat input for the welding application. In further embodiments, the desired pace may be indicated to the operator 110 through other methods. For example, the welding helmet 56 may be equipped with a sound emitter 174 configured to provide an audible indication to the operator 110 for the pace at which the welding torch 26 should pass each of the markings 154.

Figure 7:
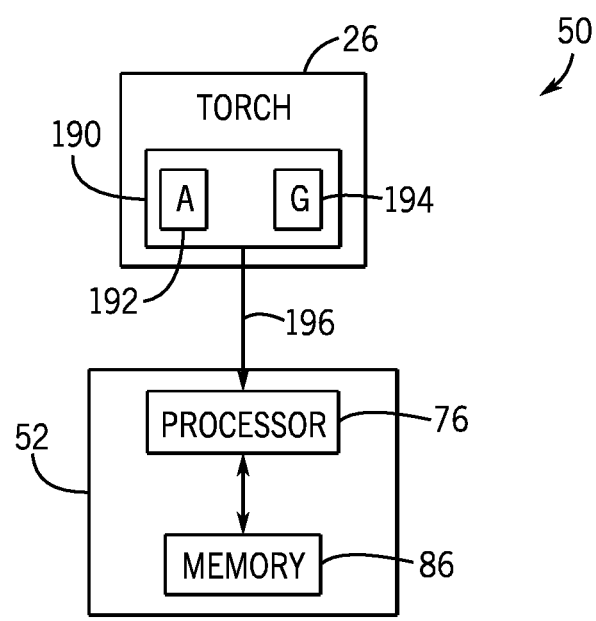
FIG. 7 is a block diagram of an embodiment of an inertial sensing system that may be used to determine a weld travel speed of a welding torch.

It should be noted that a variety of other methods and devices may also be employed to determine the travel speed of the welding torch 26 over time during a welding operation. For example, in an embodiment, an inertial sensing technique may be utilized. One such embodiment is illustrated as a block diagram in FIG. 7. In the illustrated embodiment, an inertial sensing module 190 is disposed in the welding torch 26. The inertial sensing module 190 may perform inertial sensing of torch position using combinations of accelerometers 192 and gyroscopes 194 to sense up to approximately six degrees of freedom of motion. By utilizing the accelerometers 192 and gyroscopes 194 to determine the acceleration of the welding torch 26, the speed can be obtained by integrating the acceleration over time. In some embodiments, however, it may be desirable to correct or accommodate for certain factors, such as small offsets or biases and stochastic random signal variations due to thermal and other effects.

In one embodiment, these biases may be addressed by placing the inertial sensing module 190 attached to the welding torch 26 in a calibration device that causes a known acceleration (magnitude and direction) to be input to the welding torch 26. For example, the calibration device may be any device capable of holding the welding torch 26 substantially stationary in one or more orientations in the earth's gravitational field. The calibration device may be heated to a steady state temperature typically reached by the welding torch 26 during welding to reduce the effects of changing temperature during welding. Signals 196 from the inertial sensing module 190 may be measured and compared against the expected measurements. Indeed, a variety of methods and techniques may be utilized to reduce or eliminate the likelihood of such biases affecting the travel speed calculation. For example, calibration results may be stored in the memory 86 of the travel speed monitoring device 52 as a mapping of inertial sensor module signals to expected values. Upon receiving the signals 196 from the inertial sensing module 190, the processor 76 may correct for any offsets or biases based on the mapping stored in the memory 86.

Additionally, it should be noted that in certain embodiments, it may be desirable to determine and monitor the travel speed of the welding torch 26 over the total distance of the workpiece 14 being welded, and not the total distance travelled by the welding torch 26. That is, in instances in which the operator 110 performs a weld in a traditional pattern, such as weaving, the welding torch 26 may travel a large distance while only covering a small portion of the workpiece 14. If such a technique is used by the operator 110, the interpretation of the weld travel speed may be adjusted to compensate for the weaving motion to derive the travel speed along a travel direction (X) of the weld. Therefore, in some embodiments, the weld travel speed will not simply be the sum of the length of the weld vector. Instead, the algorithm for calculating weld travel speed may continually determine the straight line or planar distance between a current weld location and some prior reference location and divide this distance by the elapsed weld time between the two locations. The elapsed time between points may be held constant, or the initial reference point may be held constant at a weld initiation location. In some embodiments, the elapsed time between the two locations may be adjusted to be a longer time interval when weaving is detected.

In some embodiments, the distance between the current weld tip location and the prior reference location may be calculated, for example, by the Pythagorean Theorem if the displacements in the travel direction (X) and weave direction (Y) (or any two orthogonal directions on the weld surface) is known. If this distance is found to be non-monotonically increasing, then a weaving technique may be identified. Further, in embodiments in which a particular pattern (e.g., zigzag pattern) is being performed by the operator 110, the pattern may be identified by evaluating the excursions in the weave direction (Y) or the near lack of travel in the travel direction (X) for some periods of time. The amount of weaving might also be detected by sensing the excursions in the weave direction (Y). For example, in an embodiment, the time between the current weld location and the prior reference location may be adjusted according to the amount of weaving detected (e.g., more weaving corresponds to a longer time). Additionally, any low-pass filtering or time averaging of the calculated travel speed may be adjusted (e.g., more weaving corresponds to a longer time or lower frequency filter).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a first sensor system configured to monitor a relative headwear position or a relative headwear orientation of a welding headwear relative to a reference point in a welding environment;
   a second sensor system configured to track a relative tool position or relative tool orientation of a hand tool relative to the welding headwear, wherein the welding headwear comprises the second sensor system, wherein the hand tool is a welding torch configured to generate a welding arc between the welding torch and a workpiece; and
   processing circuitry configured to:
      determine a tool position or tool orientation of the hand tool based on the relative headwear position or relative headwear orientation of the welding headwear relative to the reference point and the relative tool position or relative tool orientation of the hand tool relative to the welding headwear.

2. The welding system of claim 1, wherein the processing circuitry is further configured to:
   generate an augmented reality visualization based on the tool position or tool orientation of the hand tool, and
   display the augmented reality visualization on a display screen of the welding headwear.

3. The welding system of claim 2, further comprising the welding headwear, the welding headwear comprising the display screen.

4. The welding system of claim 1, wherein the welding headwear comprises a welding helmet or the hand tool comprises a welding tool.

5. The welding system of claim 1, wherein the first sensor system or second sensor system comprises an optical sensor.

6. The welding system of claim 1, wherein the processing circuitry is further configured to determine a welding quality parameter based on the tool position or the tool orientation of the hand tool, the welding quality parameter comprising a work angle of the hand tool, a travel angle of the hand tool, a travel direction of the hand tool, a travel speed of the hand tool, or a distance between a workpiece and a tip of the hand tool.

7. The welding system of claim 1, wherein the processing circuitry is further configured to determine a travel speed of the hand tool parallel to a weld of a workpiece based on the tool position or the tool orientation of the hand tool.

8. The welding system of claim 7, wherein the processing circuitry is further configured to compensate for a weaving motion that is not parallel to the weld of the workpiece when determining the travel speed of the hand tool parallel to the weld of the workpiece.

9. The welding system of claim 7, further comprising a weld controller configured to control a welding parameter based on the travel speed of the hand tool.

10. The welding system of claim 9, wherein the welding parameter comprises a power output of a welding power supply, a wire feed speed of a wire feeder, or a gas flow of a shielding gas.

11. A method, comprising:
   monitoring a relative helmet position or a relative helmet orientation of a welding helmet relative to a reference point in a welding environment, via a first sensor system;
   tracking a relative tool position or relative tool orientation of a welding tool relative to the welding helmet, via a second sensor system, wherein the welding helmet comprises the second sensor system, wherein the welding tool is a welding torch configured to generate a welding arc between the welding torch and a workpiece;
   determining, via processing circuitry, a tool position or tool orientation of the welding tool based on the relative helmet position or relative helmet orientation of the welding helmet relative to the reference point and the relative tool position or relative tool orientation of the welding tool relative to the welding helmet;
   generating an augmented reality visualization based on the tool position or tool orientation of the welding tool; and
   displaying the augmented reality visualization on a display screen.

12. The method of claim 11, wherein the tool position comprises a first tool position, the method further comprising:
   determining a second tool position of the welding tool; and
   calibrating a joint position of a joint of a welding workpiece based on the first tool position and the second tool position.

13. The method of claim 11, wherein the welding helmet comprises the display screen.

14. The method of claim 11, wherein the first sensor system or second sensor system comprises an optical sensor.

15. The method of claim 11, further comprising determining, via the processing circuitry, a welding quality parameter based on the tool position or the tool orientation of the welding tool, the welding quality parameter comprising a work angle of the welding tool, a travel angle of the welding tool, a travel direction of the welding tool, a travel speed of the welding tool, or a distance between a workpiece and a tip of the welding tool.

16. The method of claim 15, wherein the augmented reality visualization comprises a visual indicator that indicates the welding quality parameter.

17. The method of claim 11, further comprising determining, via the processing circuitry, a travel speed of the welding tool parallel to a weld of a workpiece based on the tool position or the tool orientation of the welding tool.

18. The method of claim 17, further comprising compensating, via the processing circuitry, for a weaving motion that is not parallel to the weld of the workpiece when determining the travel speed of the welding tool parallel to the weld of the workpiece.

19. The method of claim 17, further comprising controlling a welding parameter, via a weld controller, based on the travel speed of the welding tool.

20. The method of claim 19, wherein the welding parameter comprises a power output of a welding power supply, a wire feed speed of a wire feeder, or a gas flow of a shielding gas.

* * * * *